(12) United States Patent
Freed

(10) Patent No.: US 9,095,100 B2
(45) Date of Patent: Aug. 4, 2015

(54) DEVICE FOR SECURING TEXTILES TO THE GROUND

(71) Applicant: Larry Freed, Newbury Park, CA (US)

(72) Inventor: Larry Freed, Newbury Park, CA (US)

( * ) Notice: Subject to any disclaimer, the term of this patent is extended or adjusted under 35 U.S.C. 154(b) by 0 days.

(21) Appl. No.: 14/335,435

(22) Filed: Jul. 18, 2014

(65) Prior Publication Data
US 2015/0020858 A1  Jan. 22, 2015

Related U.S. Application Data

(60) Provisional application No. 61/856,477, filed on Jul. 19, 2013.

(51) Int. Cl.
*E04H 15/62* (2006.01)
*A45F 3/44* (2006.01)
*A01G 13/00* (2006.01)
*A47G 9/06* (2006.01)

(52) U.S. Cl.
CPC ............ *A01G 13/0293* (2013.01); *E04H 15/62* (2013.01); *A47G 9/062* (2013.01)

(58) Field of Classification Search
CPC .... A47G 9/062; E04H 15/62; F21V 21/0824; A45F 3/44; A01G 13/0293

USPC ............. 52/4, 155; 5/417; 135/118; 248/156, 248/545; D8/388, 391, 394; 411/480, 922
See application file for complete search history.

(56) References Cited

U.S. PATENT DOCUMENTS

| D325,678 S | * | 4/1992 | Niles | D6/417 |
|---|---|---|---|---|
| D325,870 S | * | 5/1992 | Niles | D8/388 |
| D426,147 S | * | 6/2000 | Nichols | D8/391 |
| D697,395 S | * | 1/2014 | Adams | D8/395 |
| 2003/0019034 A1 | * | 1/2003 | Hyduk | 5/417 |
| 2005/0005355 A1 | * | 1/2005 | Marks et al. | 5/417 |
| 2013/0227782 A1 | * | 9/2013 | Marks et al. | 5/417 |

* cited by examiner

*Primary Examiner* — Robert Canfield
(74) *Attorney, Agent, or Firm* — Lewis Anten, Esq.; Lewis Anten, P.C.

(57) ABSTRACT

A device for securing textiles to the ground, the device having an elongated body with one end adapted to accept a locking ring so that a textile may be secured by compression in between the locking ring and the elongated body. The elongated body has an upper section and a lower section opposite of the upper section. The upper section has a shaft and had adapted to receive the locking ring and its circumference. The lower section is tapered for insertion into the ground. A textile such as towel, blanket, tarpaulin, and the like may be secured by compression between the upper section of the body and the locking ring.

20 Claims, 9 Drawing Sheets

DEVICE FOR SECURING TEXTILES TO THE GROUND

CROSS-REFERENCE TO RELATED APPLICATION

This patent application claims the benefit of U.S. Provisional Patent Application Ser. No. 61/856,477, filed Jul. 19, 2013, entitled "Device for Securing Textiles to the Ground," which application is incorporated in its entirety here by this reference.

TECHNICAL FIELD

This invention relates to a device and method for securing textiles to the ground.

BACKGROUND

Textiles and other flexible materials in sheet form that are laid onto the ground, such as on sand, dirt, grass, and the like, often times flail in the wind or are disheveled by users walking, running, or resting on the material. Various forms of weights, anchors, stakes, and tacks have been used to fasten or affix blankets and towels to the ground. However, devices for retaining towels are often inserted into the ground around the perimeter of the towel or blanket, creating a tripping hazard for those walking nearby. Some devices require sand or another material to be filled into the device for additional anchoring weight. Other devices use spring clips to retain the towel or blanket, which may cause the material to tear if pulled away from the device. Because other devices also often comprise sharp corners and ends, they may cause injury if a person falls onto them, which is very likely in environments such as the beach.

For the foregoing reasons, there is a need for a device that can secure textiles to the ground in a manner that is safe and does not cause damage to the material being secured.

SUMMARY

The solution is found in the present disclosure, which comprises an elongated body with one end adapted to accept a locking ring, between which a textile may be secured by compression. The present disclosure is directed to a device that satisfies this need to secure a textile to the ground in a manner that is safe and does not cause damage to the material being secured. The device comprises an elongated body with an upper section and a lower section opposite of the upper section. The upper section comprises a shaft and bead adapted to receive a locking ring around its circumference, while the lower section is tapered for insertion into the ground. A textile such as a towel, blanket, tarpaulin, and the like may be secured by compression between the upper section of the body and the locking ring.

The textile is secured by first inserting the device into the ground so that the upper section of the body remains exposed. Next, the textile is laid over the upper section of the body. The locking ring is then pressed down over the textile so that the shaft and head at the top end of the body is inserted into an opening in the ring. When the locking ring is pressed down and turned, a lip in the locking ring engages the head, and the body and locking ring are drawn together, causing the textile to be secured by compression, The device of the present disclosure can secure textiles without causing damage because it uses compression between smooth surfaces. The device is inserted into the ground away from the walking path of people. The elongated body comprises blunt ends, while the locking ring comprises a smooth top surface, preventing injury if a person falls onto the device.

The locking ring of the device for securing textiles to the ground may also comprise a cup shape having sidewalls and an open top. This embodiment would allow the device to hold beverages or other items such as keys or a mobile phone. In another embodiment, the locking ring may have a grooved outer circumference like that found on a bottle cap, providing better leverage for installing and removing the ring. In another embodiment, the outer circumference of the locking ring may be a rectangular shape. In another embodiment, the locking ring may have an extended surface to function as a table top. In another embodiment, the locking ring may have an extended wall to function as a stand for books, magazines, tablets, electronic readers, and the like.

DETAILED DESCRIPTION OF THE INVENTION

Figure 1:
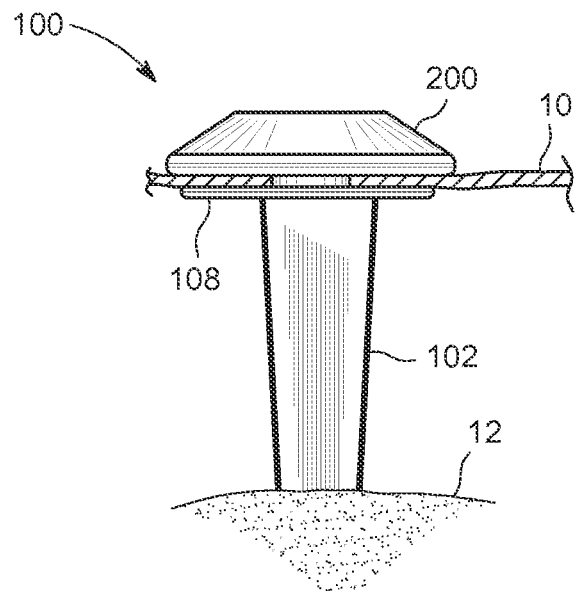
FIG. 1 illustrates an elevation view of an embodiment of the present invention in use securing a textile to the ground.
Figure 2:
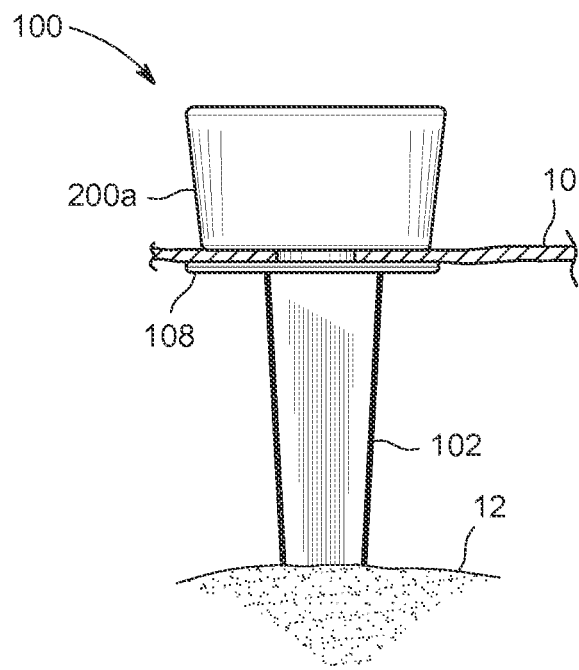
FIG. 2 illustrates an elevation view of another embodiment of the present invention in use securing a textile to the ground.
Figure 3:
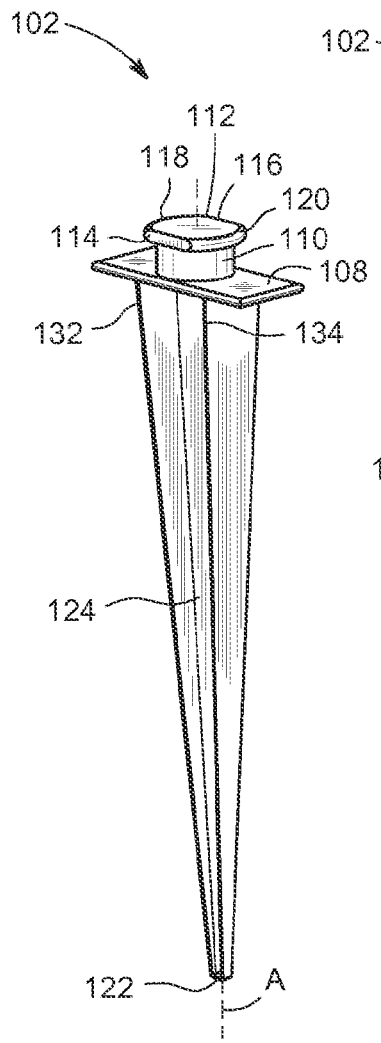
FIG. 3 illustrates a perspective view of an embodiment of the elongated body.
Figure 4:
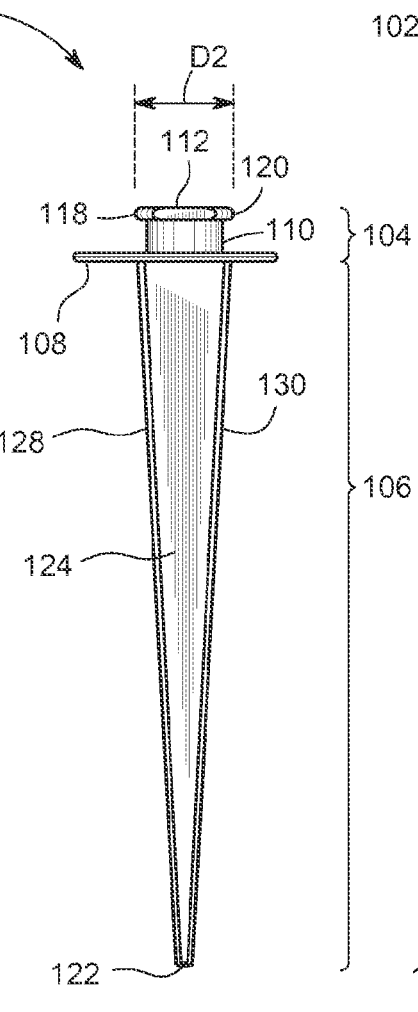
FIG. 4 illustrates a front elevation view of an elongated body embodying features of the present disclosure.
Figure 5:
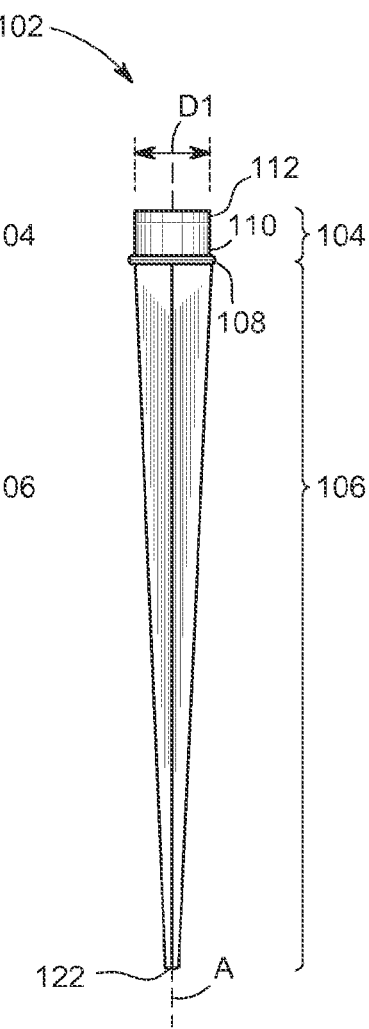
FIG. 5 illustrates a side elevation view of an elongated body embodying features of the present disclosure.

As shown in FIGS. 1-2, a device 100 for securing textiles to the ground comprises an elongated body 102, and a locking ring 200 that can be affixed to the elongated body 102. When a textile 10 is laid on top of the elongated body 102, and the locking ring 200 attached, the textile 10 becomes compressed between the body 102 and locking ring 200.

As illustrated in FIGS. 3-7 the elongated body 102, comprises an upper section 104 and a lower section 106 and defines a longitudinal axis A. In between the upper section 104 and the lower section 106 may be a platform 108 that is perpendicular to the longitudinal axis A of the elongated body 102. The platform 108 functions as a base against which the textile 10 will be pressed or sandwiched. The platform 108 may be any shape such as circular, oval, triangular, rectangular, pentagonal, hexagonal, etc.

In the upper section 104, extending distally away from the platform 108 and lower section 106 is a shaft 110 terminating at a head 112. In the preferred embodiment, the shaft 110 is generally cylindrical in shape having a diameter D1. The shaft 110 may be perpendicular to the platform 108.

The head 112, formed on top of the shaft 110, is generally circular in shape defined by a circumferential edge. In the preferred embodiment, on diametrically opposite sides, the head 112 may have a pair of circular segments removed so as to create diametrically opposed, parallel sides 114, 116 on the generally circular head 112. In other words, in the preferred embodiment, the head 112 is stadium-shaped. Described in a different way, the head 112 may also he considered generally rectangular with two opposite, parallel sides 114, 116 and two opposing circle segments 118, 120 stemming from opposite sides of the rectangle. For purposes of this application, the farthest distance between opposite points on the two circle segments 118, 120 will be referred to as the diameter D2 of the head 112 and the distance between the two parallel sides 114, 116 of the rectangle will he referred to as the width W1 of the head 112.

In the preferred embodiment, the width W1 of the head 112 is substantially the same size as the diameter D1 of the shaft 110. Therefore, one side 114 of the head 112 forms a tangent with the shaft 110, and the opposite side 116 of the head 112 forms a second tangent on the diametrically opposite side of the shaft 110. The diameter D2 of the head 112 is larger than the diameter D1 of the shaft 110. As such, the circle segments 118, 120 form two diametrically opposite lip formations relative to the shaft 110. The top of the head 112 may be flat or convex.

In the preferred embodiment, the surfaces of the head 112 and shaft 110 are generally smooth to prevent or minimize any damage to the textile 10 when in use. This will allow the same textile 10 to be used repeatedly with minimal or no damage to the textile 10.

The lower section 106 of the elongated body 102 may be tapered so that it can he pressed or pounded into the ground 112 with ease. In the preferred embodiment, the elongated body 102 is pyramidal in shape, with the base of the pyramid adjacent to the upper section 104 and the pointed tip 122 of the pyramid at the bottom of the lower section 106. Preferably, the elongated body 102 comprises four faces, a first face 124, a second face 126 opposite the first face, a third face 128 adjacent to the first and second faces 124, 126, and a fourth face 130 opposite the third face 128 and adjacent to the first and second faces 124, 126.

Two opposing faces (e.g. the first face 124 and the second face 126) may each comprise two vanes 132, 134 joined at the bottom end in a V-shape. Between the vanes 132, 134 may be central webbing for increased structural integrity, similar to a tapering I-beam. The elongated body 102 may also he conical or cylindrical in shape with a pointed tip 122.

The locking ring 200 illustrated in FIGS. 8-18, may be ring shaped having a body 202 and an opening 204 therethrough. Preferably, the opening 204 is centrally located on the body 202. The locking ring 200 is adapted to he attachable to the head 112 and shaft 110 of the upper section 104 of the elongated body 102. To attach the locking ring 200 to the elongated body 102, the head 112 passes through the opening 204 and the shaft 110 remains within the opening 204.

Figure 6:
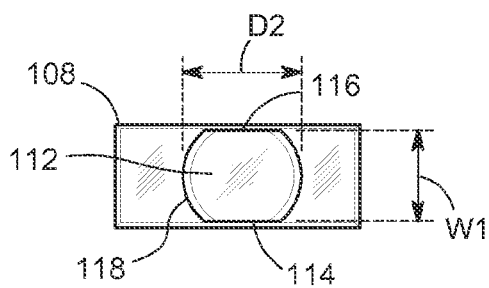
FIG. 6 illustrates a top plan view of an elongated body embodying features of the present disclosure.
Figure 7:
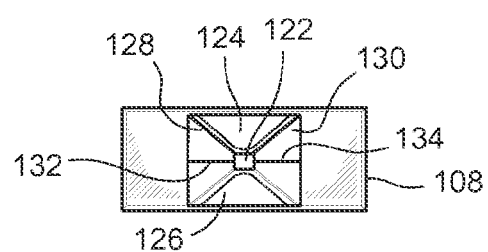
FIG. 7 illustrates a bottom plan view of an elongated body embodying features of the present disclosure.
Figure 10:
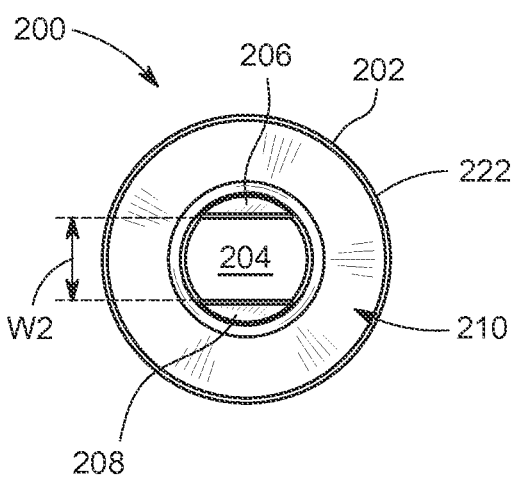
FIG. 10 illustrates a top plan view of a locking ring embodying features of the present disclosure.

As best illustrated in FIGS. 6 and 10, the opening 204 may be substantially similar in shape to the head 112, but slightly larger. Therefore, in the preferred embodiment, the opening 204 may be stadium shaped, having a generally circular shape with a pair of diametrically opposing, parallel chords defining a pair of flanges 206, 208. The flanges 206, 208 extend into the opening 204 of the locking ring 200 toward the center. The shortest distance from the first flange 206 to the second flange 208 (referred to as width W2) is greater than the width W1 of the head 112; however, the width W2 of the opening 204 is less than the diameter D2 of the head 112. Therefore, when the sides 114, 116 of the head 112 are aligned with the flanges 206, 208 of the locking ring 200, the head 112 may he inserted through the opening 204. Then, by rotating either the locking ring 200 or the head 112 from approximately 1 degree to approximately 179 degrees, the flanges 206, 208 turn underneath the circle segments 118, 120 of the head 112. Since the diameter D2 of the head 112 through the circle segments 118, 120 is greater than the width W2 between the flanges 206, 208, the head 112 cannot be withdrawn from the opening 204; thereby, engaging the locking ring 200 against the bottom edge of the head 112. In some embodiments, the flanges 206, 208 may be ramped or in a helical configuration, like threading on a screw, such that when turned, the locking ring 200 is drawn towards the platform 108, causing a textile 10 secured between the platform 108 and the bottom surface of the locking ring 200 to become compressed. In addition, as the textile 10 adds thickness to the head 112 and shaft 110, it increases the friction between the head 112 or shaft and the flanges 206, 208 of the ring 200. This reduces the chance for the ring 200 to be dislodged from the elongated body 102.

The opening 204 can be any shape so long as the head 112 can be inserted through the opening 204 when the head 112 and opening 204 are aligned in a first configuration with the sides 114, 116 of the head 112 parallel with the flanges 206, 208, and the head 112 cannot be removed from the opening 204 when the head 112 and opening 204 are rotated relative to each other in a second configuration with the sides 114, 116 of the head 112 not parallel with the flanges 206, 208.

Figure 8:
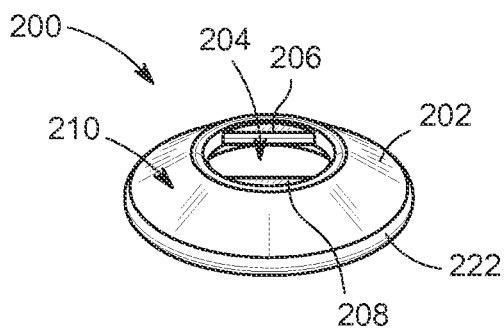
FIG. 8 illustrates a top perspective view of a locking ring embodying features of the present disclosure for a device for securing textiles to the ground.
Figure 9:
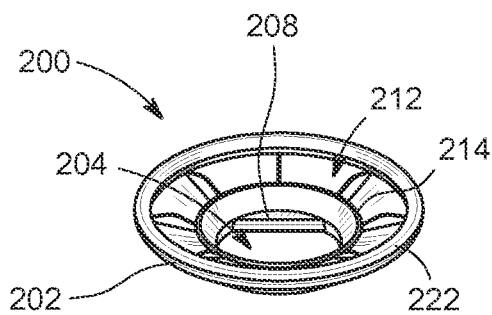
FIG. 9 illustrates a bottom perspective view of a locking ring embodying features of the present disclosure.
Figure 11:
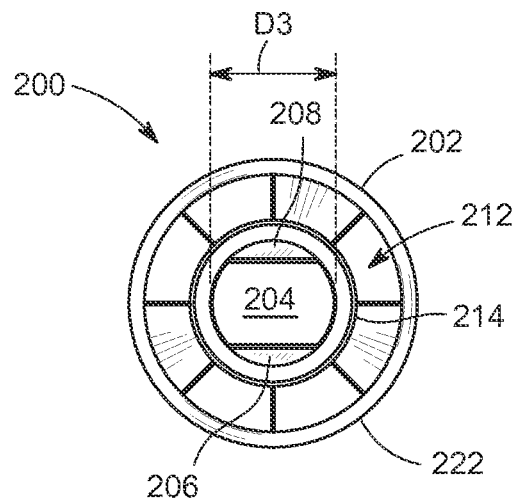
FIG. 11 illustrates a bottom plan view of a locking ring embodying features of the present disclosure.
Figure 12:
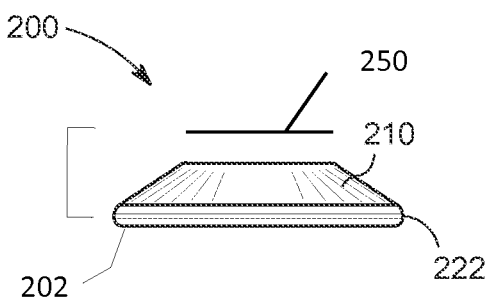
FIG. 12 illustrates a side elevation view of a locking ring embodying features of the present disclosure.
Figure 21:
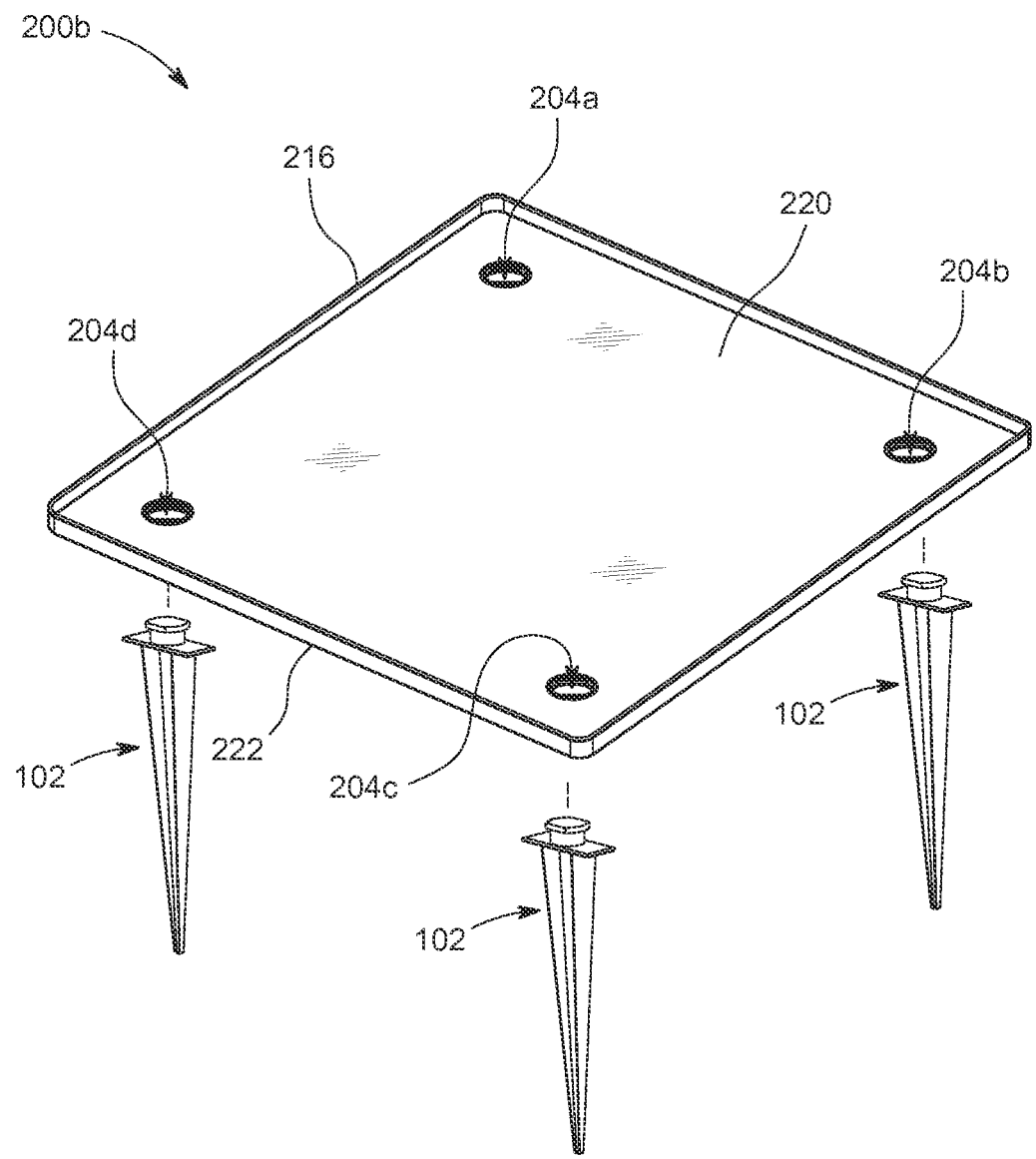
FIG. 21 illustrates a perspective view of a locking ring with a flat extended surface to function as a table top.

In a preferred embodiment, the top surface 210 of the locking ring 200 may have a convex shape, such as frustoconical or dome shape, as illustrated in FIGS. 8 and 12. In some embodiments, as shown in FIG. 21, the top surface 210 may be flat. These types of shapes create a smooth top surface which reduces injury in the event a passerby accidently steps or falls on the device 100. The bottom surface 212 of the locking ring 200 may be concave to reduce weight and material, as illustrated in FIG. 9. To increase structural integrity, the bottom surface 212 of the locking ring 200 may include one or more buttress 214 extending from the inner circumference of the opening 204, as best illustrated in FIGS. 9 and 11. In the preferred embodiment, the buttress 214 forms a cylindrical ring protruding downwardly from the opening 204.

Figure 13:
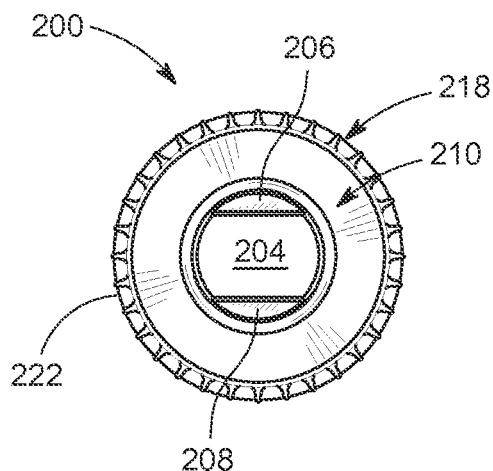
FIG. 13 illustrates a top plan view of another embodiment of a locking ring embodying features of the present disclosure.
Figure 14:
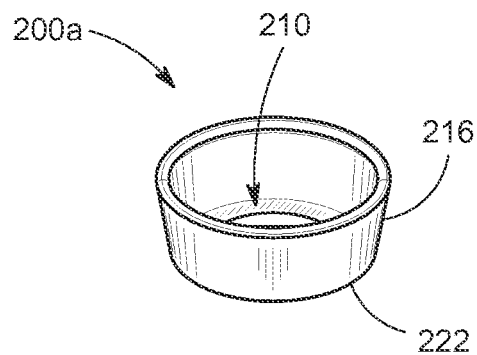
FIG. 14 illustrates a top perspective view of an alternate embodiment of a locking ring embodying features of the present disclosure for a device for securing textiles to the ground.
Figure 15:
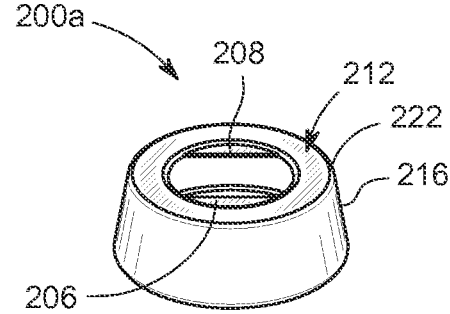
FIG. 15 illustrates a bottom perspective view of an alternate embodiment of a locking ring embodying features of the present disclosure.
Figure 16:
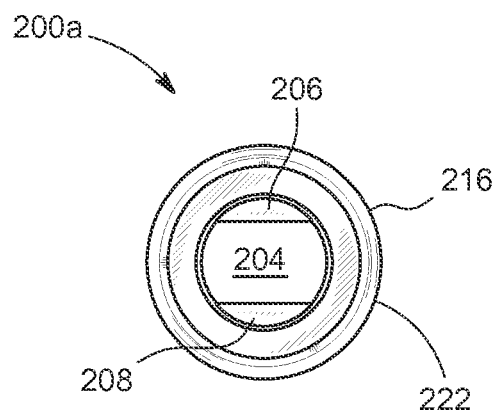
FIG. 16 illustrates a top plan view of an alternate embodiment of a locking ring embodying features of the present disclosure.
Figure 17:
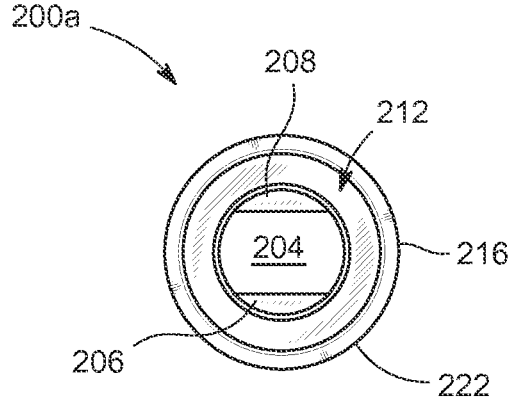
FIG. 17 illustrates a bottom plan view of an alternate embodiment of a locking ring embodying features of the present disclosure.
Figure 18:
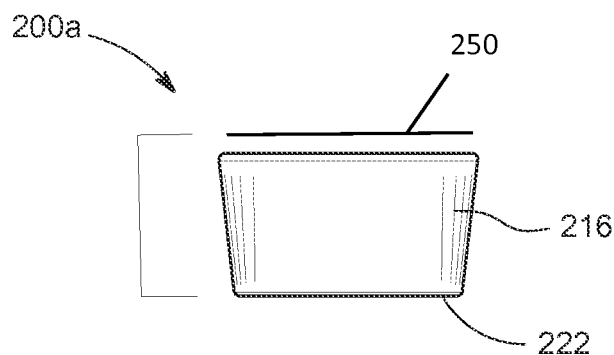
FIG. 18 illustrates a side elevation view of an alternate embodiment of a locking ring embodying features of the present disclosure.

In some embodiments, as illustrated in FIG. 13, the perimeter 222 of the locking ring 200 may comprise grooves 218 to improve gripping. In some embodiments, the grooves 218 may mimic the appearance of a bottle cap. In some embodiments, the top surface 210 may comprise advertising, promotional material, logos, or any other type of imagery and/or text. In some embodiments the opening 204 of the locking ring 200 may pass through the top and bottom surfaces 210, 212 or only the bottom surface 212. Thus the top surface 210 may he fully covered. The perimeter 222 of the locking ring 200 may be any regular or irregular shape, including an oval, triangle, square, rectangle, and the like.

In another embodiment, illustrated in FIGS. 2 and 14-18, the locking ring's outer perimeter may include at least one wall 216 that extends upwardly and away from the bottom surface 212. The at least one wall 216 along with the top surface 210 of the locking ring 200a forms a cavity into which various items can be placed. In some embodiments, a single, cylindrical wall 216 may be used so as to form a cup shape. This cup-shaped locking ring 200a may he used to hold a beverage or accessories commonly carried, such as a mobile phone or keys. Other shapes can be used. For example, two walls may be used for an oval shape, three walls may be used for a triangular shape, four walls may be used for a rectangular shape, etc.

In some embodiments, the flat or dome-shaped locking ring 200 may serve as a lid for the cup-shaped locking ring 200a. The lid or top 250 may screw on, snap on, squeeze on, etc., to the opening of the cup-shaped locking ring 200a; thereby keeping the contents of the cup more secure. In some embodiments, the flat or dome-shaped locking ring 200 may comprise a top 250 to cover the opening 204 of the locking ring 200. The top 250 may cover just the opening 204, or it may cover the entire top surface of the locking ring 200. In such embodiments, the top 250 may have advertisements, promotional material, logos, or any other imagery and/or text. In some embodiments, in which the locking ring 200 comprises grooves on its perimeter edge to look like a bottle cap, the top 250 may have logos of popular beverage drinks sold in bottles with bottle caps as advertisements to passers-by.

Figure 22:
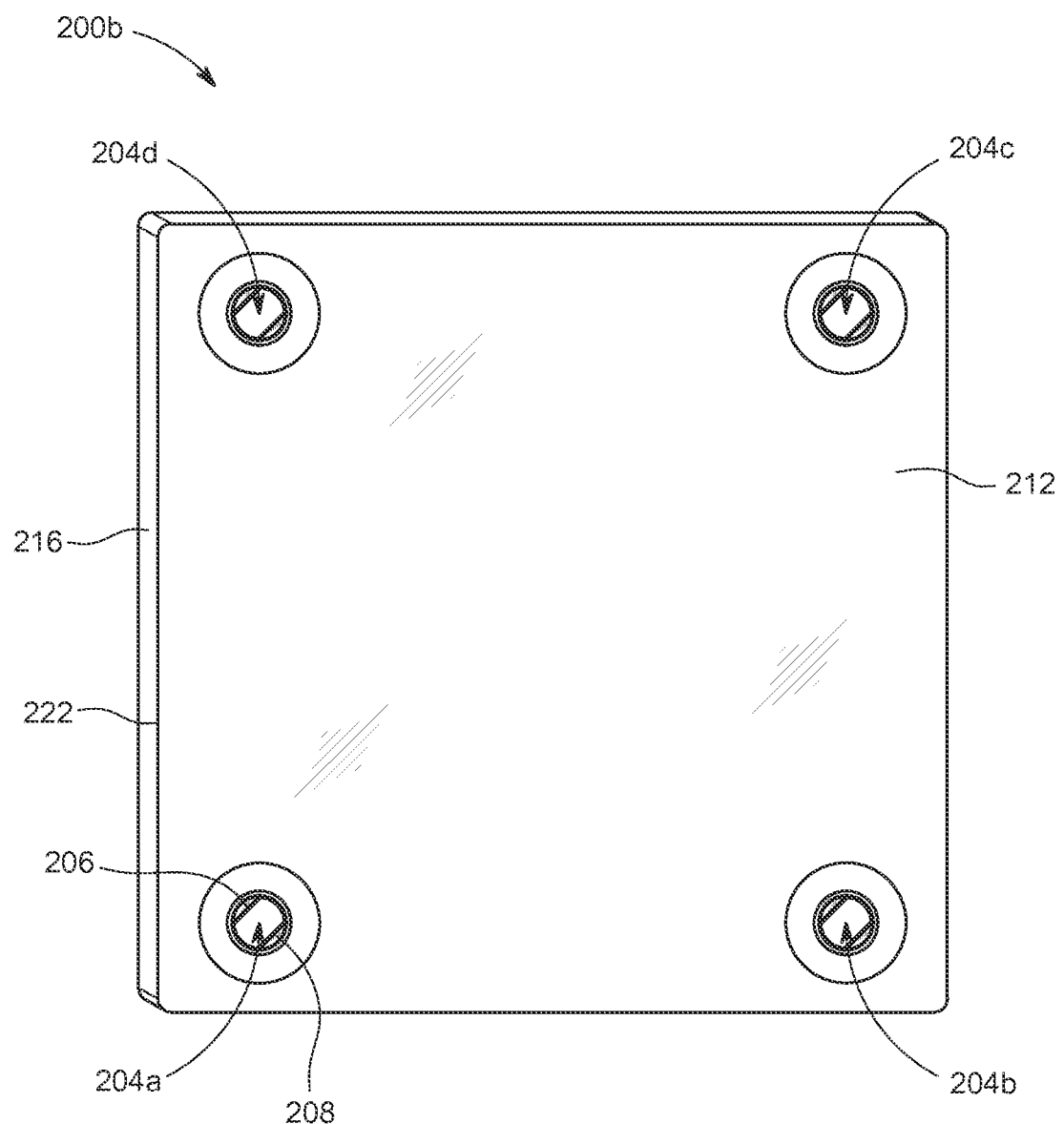
FIG. 22 illustrates a bottom view of the table top locking ring.

As shown in FIGS. 21 and 22, in some embodiments of the locking ring 200b, the top surface 210 may be an extended, flat surface with a plurality of openings 204a-d through the surface 210. Each opening 220a-d may comprise the flanges 206, 208 to lock with the elongated body 102. This allows for the locking ring 200b to function as a table top so that the user can place various items on top of the locking ring 200b, such as food, books, electronic devices to use (as opposed to storing), and the like. Preferably, the plurality of openings 204a-d are positioned adjacent to the perimeter edge 222.

In embodiments with an extended surface, the wall 216 may be shallow so as to prevent items on the locking ring 200b from sliding of the edge 222.

Figure 23:
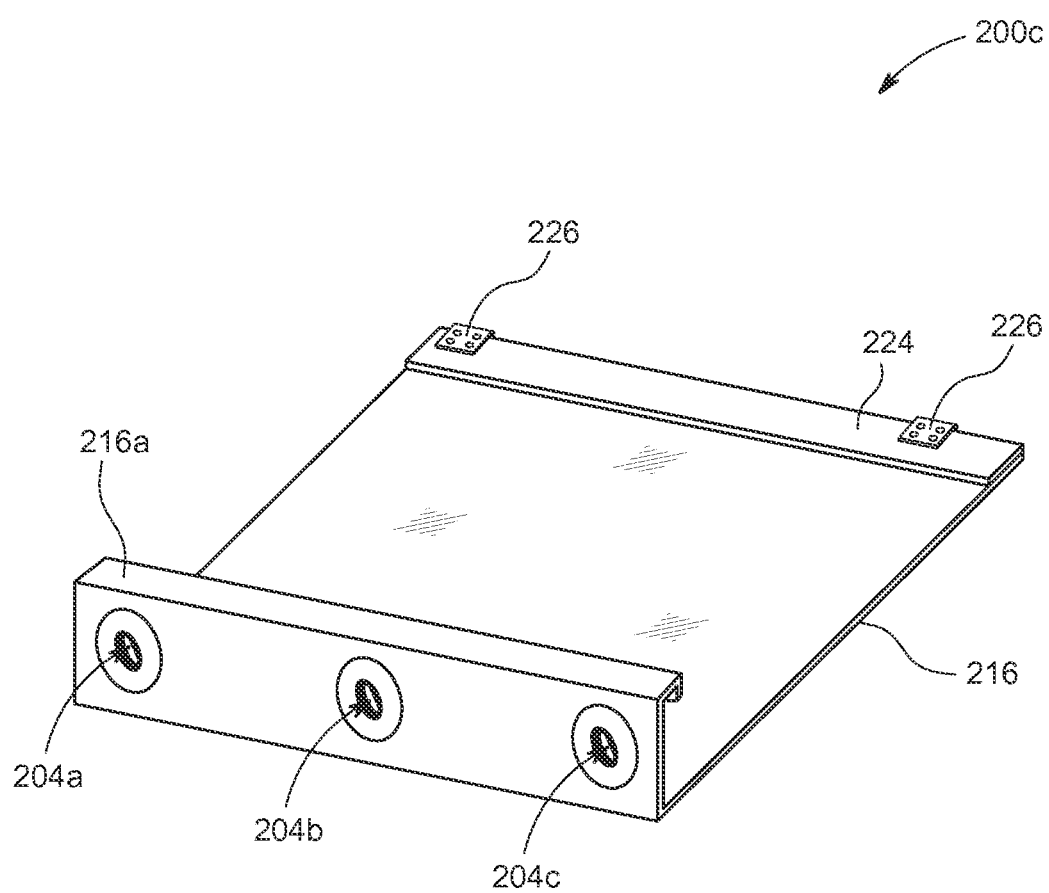
FIG. 23 illustrates a bottom perspective view of a locking ring with an extended wall to function as a stand.
Figure 24:
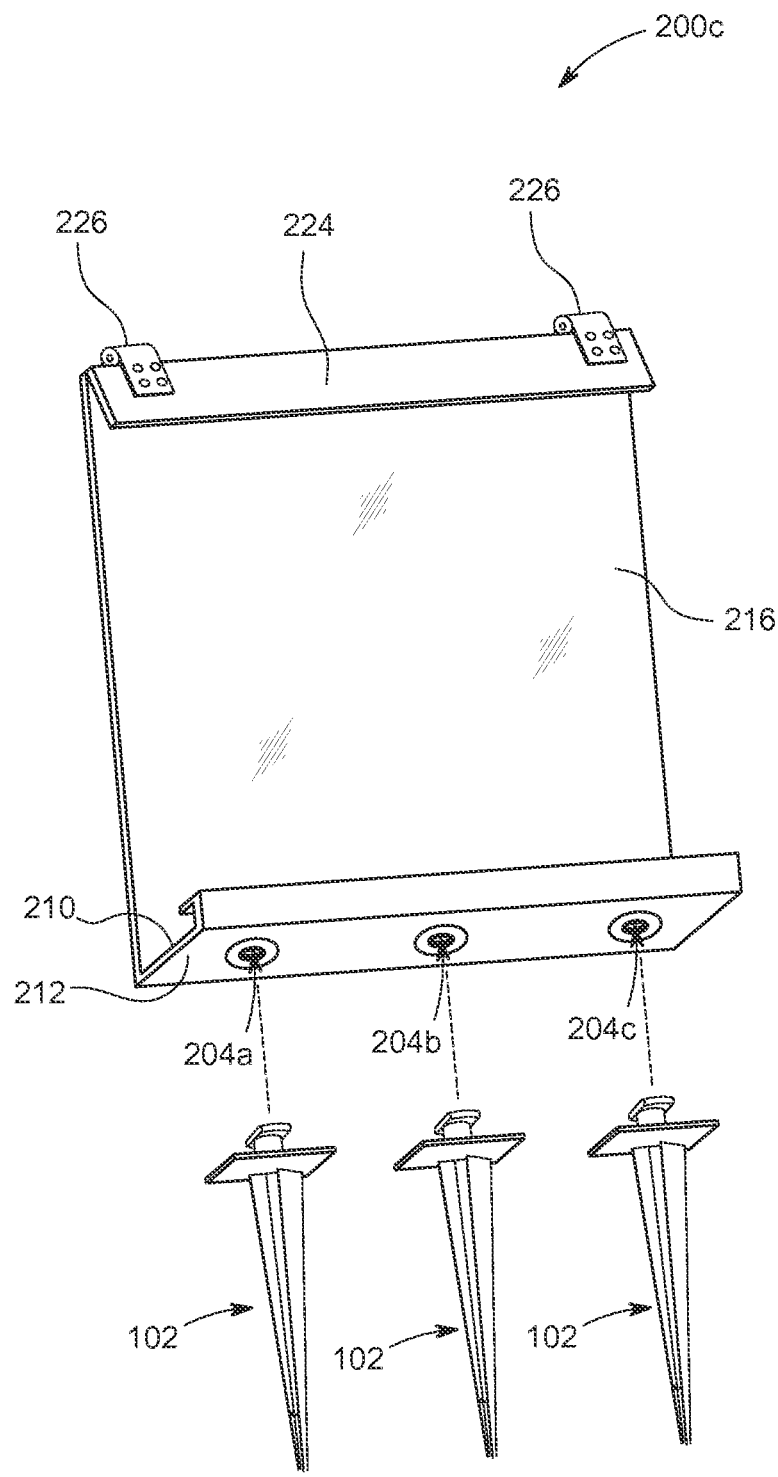
FIG. 24 illustrates a front perspective view of the stand locking ring.

As shown in FIGS. 23 and 24, in some embodiments, the locking ring 200c may have an extended surface 210, 212 and a wall 216 to form a vertical stand. By way of example only, the top and bottom surfaces 210, 212 may be rectangular in shape. The locking ring 200c may have a plurality of openings 204a-c, preferably, linearly arranged on the top and bottom surfaces 210, 212 each opening 204a-c having opposing flanges 206, 208. A main wall 216 may extend vertically upwardly on one side. A shorter wall 216a may extend vertically upwardly opposite the main wall 216. A flat item, such as a book, paper, tablet, electronic reader, and the like, can he placed on the top surface 210 and leaned against the main wall 216. This may allow the bottom edge of the item to abut against the shorter wall 216a to prevent, the item from slipping of the top surface 210. In some embodiments, the main wall 216 may comprises an extension 224. This extension can extend the vertical length of the main wall 216 to accommodate items of different sizes. For example, the extension 224 may telescope up above main wall 216. In some embodiments, the extension 224 may be hingedly 226 attached to the main wall 216 to flip up and down. In some embodiments, the hinges 226 may have stops or have resistance to allow the extension 224 to stop at any position along its path in moving from the closed configuration as shown in FIG. 23 to an open configuration as shown in FIG. 24. When fully open, the extension 224 may be parallel to the wall 216 and extend away front the wall 216. In a partially opened configuration, as shown in FIG. 24, the extension 224 can provide shading to eliminate any glare on the item perched on the locking ring 200c.

The device 100 for securing textiles to the ground can be made from any natural or synthetic material, such as wood, rubber, metal, plastic, and the like. Preferably, the device 100 is lade from a rigid plastic.

Figure 19:
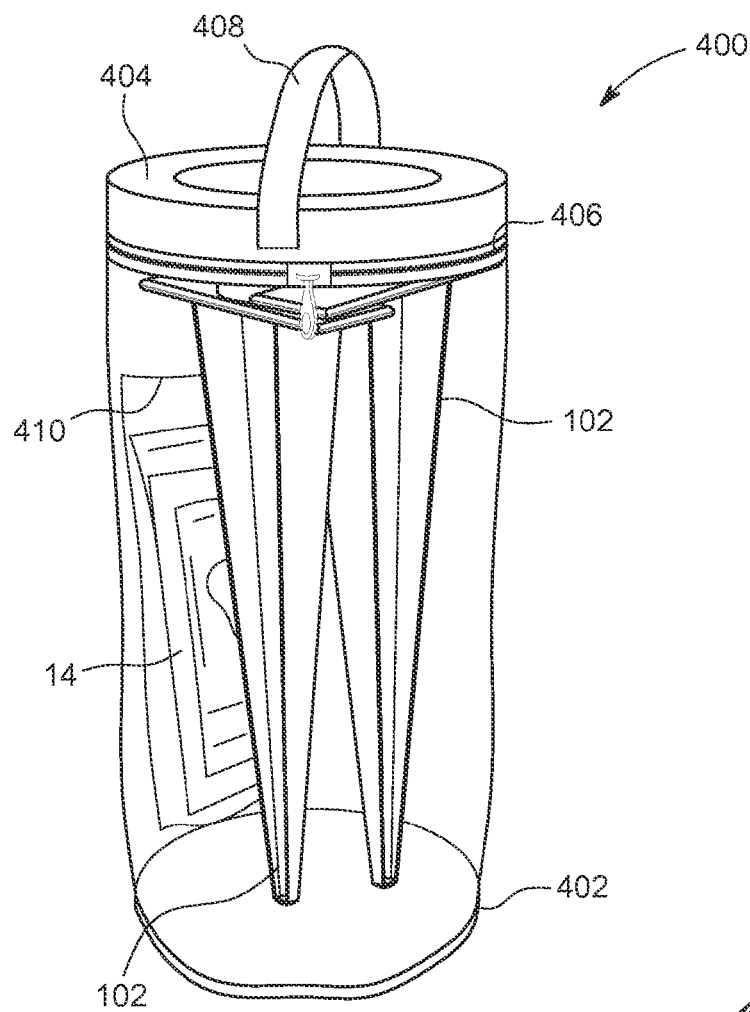
FIG. 19 illustrates a kit for the device for securing textile to the ground.
Figure 20:
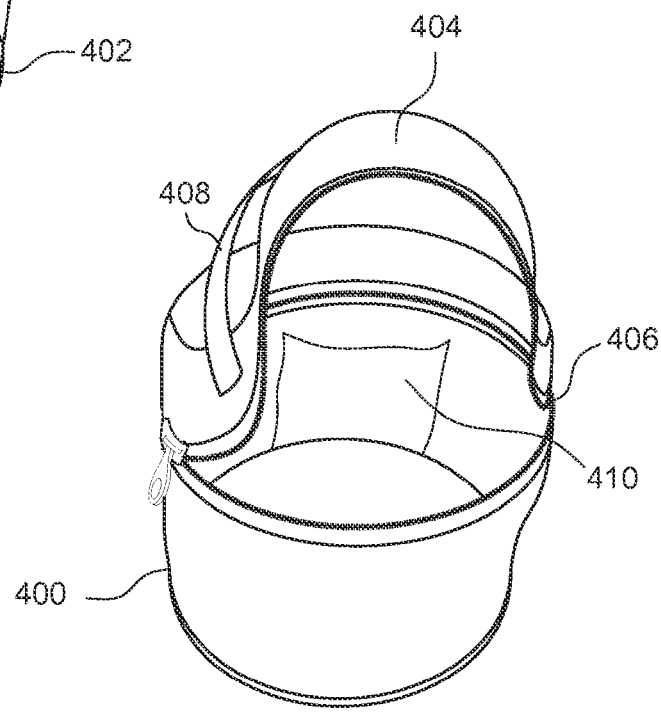
FIG. 20 illustrates a top view of an embodiment of the container for the kit.

In some embodiments, as shown in FIGS. 19-20, the device 100 may be sold as a kit 400, complete with a container 402 to carry the different components of the device 100. In the preferred embodiment, the kit 400 may comprise at least four elongated bodies 102, and four locking rings 200, one of which a may he the cup-shaped locking ring 200a that functions as a cup holder, all contained in the container 402. Additional or replacement parts can be sold separately or included in the kit, such as the table top locking ring 200b and the stand locking ring 200c. The container 402 can be used to carry the user's personal effects 14 as well. In some embodiments, the container 402 may maintain an airtight or watertight seal using a lid 404. A closure 406, such as be a zipper, hook-and-loop fasteners, magnets, snaps, adhesives, and the like, can be used to secure the container 402 in the closed configuration. The container 402 may also comprise a loop 408, for example, in the form of a handle. The user can then insert the elongated body 102 through the loop 408 and into the ground; thereby securing the user's personal effects inside the container 402 and to the ground, to prevent it from flying away, washing away, or being easily stolen. In some embodiments, the container 402 may have an inner layer 410 that serves as a pocket. This allows the user's personal effects to be separated from the device 100. Preferably, the container 402 is made of a flexible, transparent plastic material. However, the container 402 can be made of any material, such as hard plastic, soft plastic, wood, metal, fabric, and the like.

In use, the elongated body 102 is inserted into the ground so that the upper section 104 with the shaft 110 and head 112 remains exposed. The corner of a textile 10, such as a towel or blanket is then laid over the head 112 and shaft 110. The locking ring 200-200c is then pressed down over textile 10, head 112, and shaft 110 of the elongated body 102. While pressing the locking ring 200-200c down, the locking ring 200-200c is turned until the flanges 206, 208 of the locking ring align with the sides 114, 116 of the head 112. Once aligned, the head 112 along with a portion of the textile 10 can be shoved through the opening 204. Once through the opening 204, the locking ring 200-200c and elongated body 102 can be rotated relative to each other (e.g., by turning the locking ring 90 degrees) so that the flanges 206, 208 of the locking ring are engaged under the head 112 of the elongated body 102 with the portion of the textile 10 lodged therebetween. Once the locking ring 200-200c is engaged with the elongated body 102, the two are drawn together as shown in FIGS. 1-2, causing the textile 10 to be secured by compression between the upper section 104 of the elongated body 102 and the locking ring 200-200c. The procedure can be repeated at the remaining three corners of the textile 10 to secure the textile 10 to the ground. The user can pick and choose any location on the textile to apply the device 100. Because of the smooth surfaces on the shaft 110, head 112, the textile 10 is unlikely to be damaged by the device 100.

In some embodiments in which a locking ring has a plurality of openings 204a-d, it may be preferably to attach the textile 10 to the elongated body 102 and locking ring 200-200c before embedding the elongated body 102 to the ground 12. In embodiments with a plurality of openings 204a-d, separate textiles may be secured by the same locking ring. For example, in the embodiment shown in FIGS. 21-22, a first textile may be secured on one side of the locking ring 200b by openings 204a and 204b, and a second textile may be secured on the opposite side by openings 204c and 204d.

In an alternative embodiment with a plurality of openings, such as the embodiments shown in FIGS. 21-24, the openings may not be locking rings, but merely openings through which the shaft extends, and a separate locking ring may be used to secure the elongated body to the table top or vertical stand. In such an embodiment, the separate locking ring could be an independent element, or it could be retained by the table top or vertical stand in a configuration that would allow the locking ring to spin, yet still be retained. In such embodiments, the separate locking ring could be flat, concave, or convex with a vertical element or finger holes to allow it to be rotated by hand or any other suitable configuration.

Preferably, the elongated body 102 may range from approximately 8 cm to approximately 40 cm. The diameter of the locking ring 200 may range from approximately 5 cm to approximately 10 cm. The cup shaped locking ring 200a may have a wall 216 ranging from approximately 5 cm to approximately 10 cm high.

The table top locking ring 200b may have an extended surface ranging from approximately 5 cm wide by approximately 5 cm long to approximately 45 cm wide by approximately 45 cm long with at least four openings 204a-d located in the corners, in a preferred embodiment, the table top locking ring 200b may be approximately 30 cm wide by approximately 30 cm long. The table top locking ring 200b may have a wall 216 that is approximately 0.5 cm to approximately 3 cm high. Preferably, the wall 216 on the table top locking ring 200b is approximately 1 cm high.

In the stand locking ring 200c, the surface may be approximately 2 cm wide by approximately 13 cm long to approximately 8 cm wide by approximately 40 cm long. In the preferred embodiment, the surface is approximately 5 cm wide by approximately 30 cm long. The wall 216 may have a width equivalent, to the length of the surface and a height ranging from approximately 20 cm to approximately 40 cm. Preferably the height of the wall 216 is approximately 25 cm to approximately 35 cm. Most preferably, the wall is approximately 30 cm wide by 30 cm high. The extension may add an additional approximately 5 cm to approximately 15 cm to the height. The auxiliary wall 216a may range from approximately 0.5 cm to approximately 5 cm, By way of example only, the elongated body 102 may be approximately 22 cm long, having a lower section 106 of approximately 20 cm long, with the top section 104 being approximately 2 cm long. The width W1 of the head 112 and the diameter D1 of the shaft 110 may each be approximately 2 cm. The diameter D2 of the head 112 may be approximately 2.5 cm. The length of the platform 108 may be approximately 4.8 cm with a width of approximately 2.5 cm. The locking ring 200 may be approximately 7.5 cm in diameter. The width W2 of the opening 204 may be approximately 2.2 cm. The diameter D3 of the opening 204 may be approximately 2.7 cm. These dimensions may be suitable for use where the ground is soft, such as the beach.

Smaller versions may also be used where the ground tends to be harder, such as the park, back yard, school yard, and the like where there is grass and dirt. For example, the elongated body 102 may be approximately 4 cm.

Other dimensions may be used so long as there is sufficient gap between the head 112 and the opening 204 so that a textile 10 covering the head 112 is able to squeeze through the opening 204 without significantly damaging the textile 10. Therefore, the device 100 may come in a variety of sizes to suit textiles of different thicknesses. Alternatively, the device 100 may include a lock to secure the blanket to the shaft 110 and head 112 and against the flange 206, 208, to function like a cam lock. This allows the gap in between the head 112 and the opening 204 and/or between the shaft 110 and the opening 204 to be larger. With the head 112 and a portion of the shaft 110 sticking out above the top surface 210 of the locking ring 200 through the opening 204 with a portion of the textile, the lock, which has dimensions that are larger than the opening 204 can then be inserted in between the head 112 and the opening 204 and secured to the shaft 110 with the textile therebetween. Thus, the frictional force is created by the lock sandwiched in between the head 112 and the top surface 10 of the lock ring 200.

All features disclosed in this specification, including any accompanying claim, abstract, and drawings, may be replaced by alternative features serving the same, equivalent or similar purpose, unless expressly stated otherwise. Thus, unless expressly stated otherwise, each feature disclosed is one example only of a generic series of equivalent or similar features.

The foregoing description of the preferred embodiment of the invention has been presented for the purposes of illustration and description. It is not, intended to be exhaustive or to limit the invention to the precise form disclosed. Many modifications and variations are possible in light of the above teaching. It is intended that the scope of the invention not be limited by this detailed description, but by the claims and the equivalents to the claims appended hereto.

What is claimed is:

1. A device for securing textiles to a ground, comprising:
   a. an elongated body having an upper section, a lower section adjacent to the upper section, and a platform therebetween, the upper section comprising:
      i. a shaft extending away from the lower section, the shaft terminating at a head, the shaft being generally cylindrical defining a shaft diameter, and the head being stadium-shaped having opposite, parallel sides, the opposite parallel sides being joined by oppositely arranged circle segments, wherein a farthest distance between the circle segments defines a head diameter and a shortest distance between the opposing parallel sides defines a head width, wherein the head width is substantially equivalent to the shaft diameter, wherein the head diameter is larger than the shaft diameter, thereby defining a first pair of diametrically opposed lips, b. wherein the lower section of the elongated body is tapered away from upper section and terminating at a point, the lower section comprising:
  i. a first face,
  ii. a second face opposite the first face,
  iii. a third face adjacent to the first and second faces, and
  iv. a fourth face opposite the third face and adjacent to the first and second faces, the first and second faces each comprising two vanes tapering towards the point in a V-shape;
c. a locking ring attachable to the elongated body, the locking ring having a ring shaped body having a top surface, a bottom surface, and a central opening therethrough, the central opening being stadium-shaped and defined by a pair of diametrically opposed circle segments defining an opening diameter, and a pair of diametrically opposed, parallel chords defining a pair of straight flanges adjacent to and connecting the circle segments, the flanges extending radially inwardly, wherein a distance between the flanges defines an opening width, wherein the opening width is greater than the head width, and the opening width is less than the head diameter, and wherein the bottom surface of the locking ring comprises one or more buttresses extending from an inner circumference of the central opening; and
c. a top to cover the central opening of the locking ring.

2. The device of claim 1, wherein the top surface of the locking ring has a convex shape.

3. The device of claim 2, wherein the perimeter of the locking ring comprises grooves.

4. The device of claim 1, wherein the locking ring comprises at least one wall that extends away from the bottom surface defining a cavity.

5. The device of claim 1, wherein the flanges are ramped.

6. A kit for securing textiles to a ground, comprising:
a. an elongated body having an upper section, a lower section adjacent to the upper section, the upper section comprising a shaft extending away from the lower section, the shaft terminating at a head, wherein the lower section of the elongated body is tapered away from upper section terminating at a point; and
b. a locking ring attachable to the elongated body, the locking ring having a top surface, a bottom surface, and an opening there through into which the head can be inserted, wherein the head and the opening are configured to lock together with a piece of textile inserted therebetween, wherein the opening of the locking ring is stadium-shape defined by a circular opening having an opening diameter with a pair of diametrically opposed, parallel chords defining a pair of straight lips, the straight lips extending radially inwardly to define an opening width, wherein the pair of straight lips are ramped.

7. The kit of claim 6, wherein the shaft is generally cylindrical defining a shaft diameter, and the head is stadium-shaped.

8. The kit of claim 7, wherein the stadium-shaped head is defined by opposite, parallel sides, wherein the opposite parallel sides are joined by oppositely arranged circle segments, wherein a farthest distance between the circle segments defines a head diameter and a shortest distance between the opposing parallel sides defines a head width, wherein the head diameter is larger than the shaft diameter, thereby defining a first pair of diametrically opposite lips.

9. The kit of claim 8, wherein a distance from the first lip to the second lip defines an opening width, wherein the opening width is greater than the head width, and the opening width is less than the head diameter.

10. The kit of claim 9, further comprising a top to cover the opening of the locking ring.

11. The kit of claim 6, wherein the bottom surface of the locking ring comprises one or more buttresses extending from an inner circumference of the opening.

12. The kit of claim 6, wherein the top surface of the locking ring has a convex shape.

13. The kit of claim 6, wherein the perimeter of the locking ring comprises grooves.

14. The kit of claim 6, wherein the locking ring comprises at least one wall that extends away from the bottom surface; thereby defining a cavity.

15. The kit of claim 6, wherein the elongated body comprises:
  a. a first face;
  b. a second face opposite the first face;
  c. a third face adjacent to the first and second faces; and
  d. a fourth face opposite the third face and adjacent to the first and second faces, wherein the first face and the second face each comprises two vanes joined at the bottom end in a V-shape.

16. The kit of claim 6, wherein the elongated body further comprises a platform in between the upper section and the lower section.

17. The kit of claim 6, further comprising
  a. a plurality of elongated bodies;
  b. a plurality of locking rings; and
  c. a container to hold the plurality of elongate bodies and the plurality of locking rings.

18. The kit of claim 17, wherein the container comprises an inner layer to form a pocket.

19. A kit for securing textiles to a ground, comprising:
  a. an elongated body having an upper section, a lower section adjacent to the upper section, the upper section comprising a shaft extending away from the lower section, the shaft terminating at a head, wherein the lower section of the elongated body is tapered away from upper section terminating at a point;
  b. a locking ring attachable to the elongated body, the locking ring having a top surface, a bottom surface, and an opening there through into which the head can be inserted, wherein the head and the opening are configured to lock together with a piece of textile inserted therebetween; and
  c. a second locking ring having a flat surface with dimensions greater than the locking ring, and a plurality of openings, each opening configured to lock with the head with the textile therebetween.

20. A kit for securing textiles to a ground, comprising:
  a. an elongated body having an upper section, a lower section adjacent to the upper section, the upper section comprising a shaft extending away from the lower section, the shaft terminating at a head, wherein the lower section of the elongated body is tapered away from upper section terminating at a point;
  b. a locking ring attachable to the elongated body, the locking ring having a top surface, a bottom surface, and an opening there through into which the head can be inserted, wherein the head and the opening are configured to lock together with a piece of textile inserted therebetween; and
  c. a second locking ring having a main wall on one side, an auxiliary wall opposite the main wall and shorter than the main wall, and a plurality of openings configured to lock with the head with the textile therebetween.

* * * * *